United States Patent

[11] 3,567,902

| [72] | Inventors | James B. Stearns<br>Elm Grove;<br>Robert W. Wendelburg, Milwaukee, Wis. |
|---|---|---|
| [21] | Appl. No. | 819,333 |
| [22] | Filed | Apr. 25, 1969 |
| [45] | Patented | Mar. 2, 1971 |
| [73] | Assignee | Chemetron Corporation<br>Chicago, Ill. |

[54] ARC WELDING POWER SUPPLY ASSEMBLY
10 Claims, 7 Drawing Figs.

[52] U.S. Cl.................................................. 219/131,
219/132
[51] Int. Cl................................................. B23k 9/10
[50] Field of Search.......................................... 219/130,
131, 132, 135, 137

[56] References Cited
UNITED STATES PATENTS

| 3,371,242 | 2/1968 | Aldenhoff.................... | 315/205X |
| 3,475,585 | 10/1969 | Pierce......................... | 219/131 |
| 3,296,413 | 1/1967 | Steinert....................... | 219/135 |

Primary Examiner—J. V. Truhe
Assistant Examiner—C. L. Albritton
Attorney—James E. Nilles ABSTRACT: The physical housing of an arc welding transformer-rectifier unit having a feedback control system for controlling the slope, the output inductance and the output voltage. The control system includes separate printed circuit cards for each control function interconnected into a master printed circuit board. The control system is mounted within a housing immediately behind a removable control box having individual control elements for each card. The box is releasably connected to the cards through a cable connected to the master board.

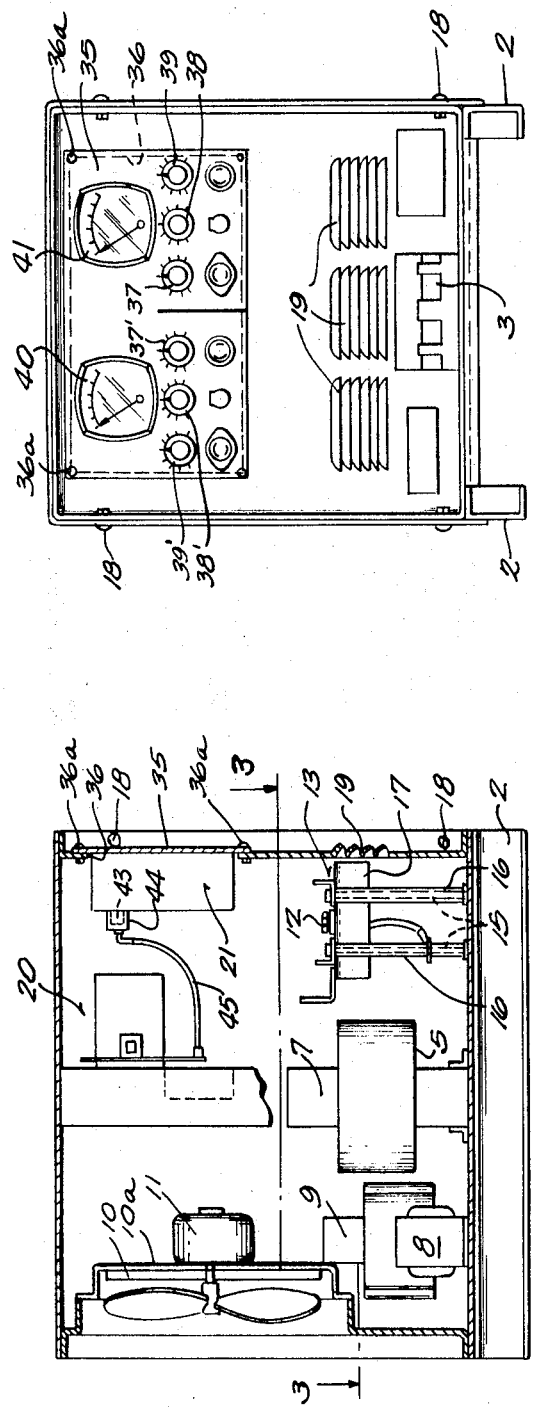
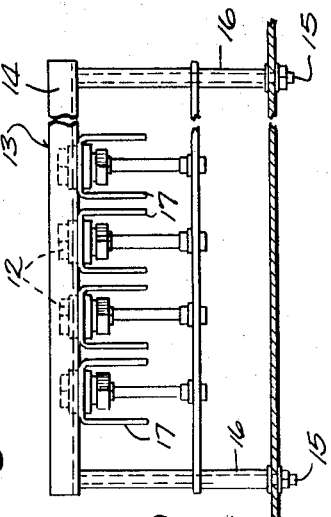
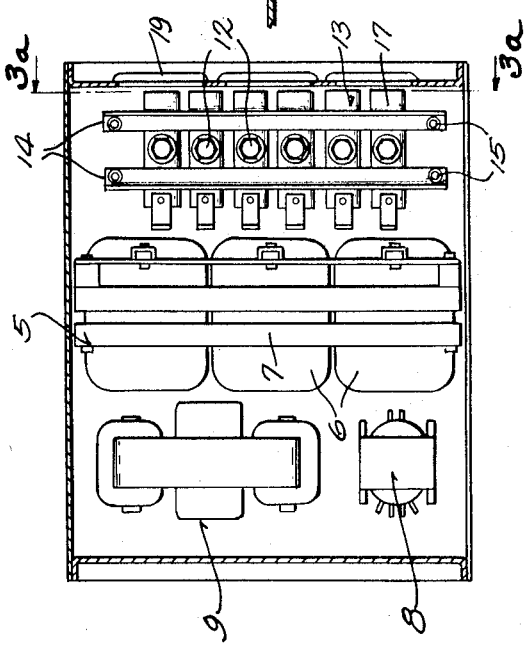

INVENTORS:
JAMES B. STEARNS
ROBERT W. WENDELBURG

BY: James E. Nilles
ATTORNEY

ARC WELDING POWER SUPPLY ASSEMBLY

BACKGROUND OF THE INVENTION

This invention relates to an arc welding power supply assembly and particularly to an improved physical assembly for mounting the several power and control components within a housing structure.

Direct current power supplies for establishing and maintaining an arc such as a welding arc between a pair of electrodes may be of a motor-generator or a transformer-rectifier construction. Transformer-rectifier units have recently been developed employing triggered solid state elements such as a silicon controlled rectifier. An usually satisfactory arc welding power supply of this character is disclosed in U.S. Pat. No. 3,337,769 to J. Buchanan and more particularly in applicant's copending application entitled, "Direct Current Arc Power Supply with Stabilized Feedback Control," which was filed on the same day as this application and is assigned to the same assignee, and more fully disclosed in the above application. The firing of the controlled rectifiers includes an adjustable current feedback signal amplifier to control the slope characteristic and connected as an input to a separate voltage feedback signal amplifier to maintain a desired constant voltage output. In addition, the system includes a saturable reactor inductance control with the load winding connected in an output lead. The circuit and firing adjustment system has been found to provide an exceptionally stable output characteristic for many different applications including the well known short arc or spray type transfer process.

In welding controls, it often happens that the work area may be removed from the location of the arc welder assembly. Generally, a remote voltage control may be provided or the like, but where a plurality of different controls are to be changed, the operator has had to return to the main power supply assembly, readjust the system, and then return to the work area. For example, the transformer-rectifier arc welding power assembly or supply employing the various adjustable features shown in the above pending application requires a corresponding control circuitry. As noted therein, the control circuit may be divided into a plurality of individual modules.

SUMMARY OF THE INVENTION

In accordance with the present invention, each of the control circuit modules is provided as a separate circuit element such as a printed card. The circuit cards are releasably mounted in a suitable support within the assembly. A master printed card or board is provided and interconnected to the several circuit cards by plug-type receptacles for receiving each of the individual cards. If the machine is malfunctioning in a particular aspect, for example, in the slope control, the operator merely removes the slope card and inserts a new one. The machine may then continue operation. The operator can readily tell from the arc characteristic and operation that portion of the circuit that is malfunctioning in one respect or another. The condition noted would specify which of the cards should be adjusted, replaced, or the like. The master printed circuit card is provided to permit convenient and ready interconnection in view of the very substantial number of interconnections which would be required between the individual cards in the absence thereof.

In addition, this construction permits the use of a particularly convenient remote control system. A boxlike housing is secured as a part of the front panel of the housing assembly and constitutes a portable box unit. The boxlike housing includes the voltage, slope, and inductance control elements as well as the necessary voltage and ampere meters suitable interconnected to the separately mounted circuit cards by a releasable cable means. The tag along or movable box housing is conveniently mounted immediately in front of the circuit board assembly to expose the circuit board assembly upon removal of the remote control box for purposes of convenient access to the assembly. The main transformer and rectifier bank is mounted to the base structure of the housing assembly. In accordance with an important aspect of this particular packaging system, the inductance control is preferably constructed in accordance with the teaching of applicants' copending application entitled "Direct Current Power Supply with Adjustable Inductance Control" which is assigned to the same assignee as the present application and was filed on the same day as this application. As more fully disclosed therein, the inductance control elements provided within the remote control box is a low wattage potentiometer type control. This provides minimal heating within the unit and avoids damaging of the components as a result of adverse high temperature.

BRIEF DESCRIPTION OF THE DRAWINGS

FIG. 1 is a front elevational view of an arc welding apparatus constructed in accordance with the present invention;

FIG. 2 is a side elevational view with parts broken away and showing the main arrangement of the several components;

FIG. 3 is a plan view taken generally on line 3–3 of FIG. 2;

FIG. 3a is a sectional view taken along line 3a–3a in FIG. 3;

DESCRIPTION OF A PREFERRED EMBODIMENT

Figure 5:
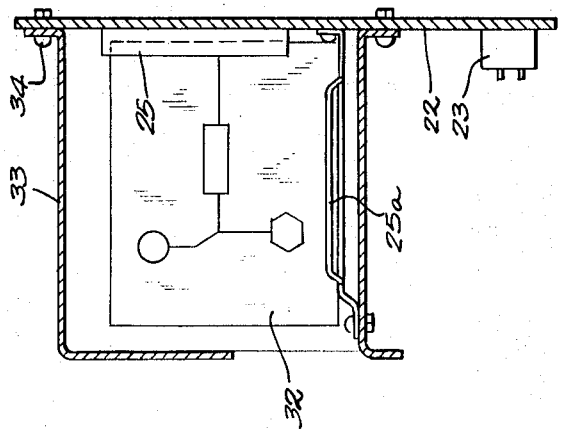
FIG. 5 is a fragmentary side elevational view of FIG. 3.

Referring to the drawings and particularly to FIGS. 1 and 2, the illustrated embodiment of the invention generally includes an outer rectangular housing assembly or enclosure 1, having a pair of supporting legs 2 extending along the bottom thereof. A pair of output terminal units 3 are provided in a removable front panel 4 for interconnection of suitable electrode leads (not shown). The terminal units 3 are connected to a transformer-rectifier unit including a main polyphase welding transformer 5 suitably mounted to the bottom wall of the housing 1 intermediate the depth of the housing, as most clearly shown in FIG. 2. The illustrated transformer assembly 5 includes three separate phase windings 6 wound on a core assembly 7 which is fixed to the bottom of the housing 1 and projects upwardly thereof approximately one-half the distance of the housing. A control transformer 8 and a variable inductor 9 are secured to the base of the housing immediately behind the main transformer 7. Immediately above the transformer 8 and the inductor 9, a slope control resistor 10 is connected by a shallow U-shaped mounting bracket 10a secured overlying an opening in the back wall of the housing. A fan assembly 11 is secured within the opening in alignment with the control resistor 10 to pass cooling air through the assembly and over the various operating and control components and in particular, over the resistor 10 to prevent excessive generation of heat. In accordance with the present invention, a plurality of controlled rectifiers 12 are connected to the transformer windings 6 to provide a full wave rectified output at the DC terminals 3. The rectifiers 12 are mounted as an assembly 13 to the bottom wall of the housing immediately in front of the main transformer assembly 5 and adjacent the front panel 4. The rectifier assembly 13 includes a pair of spaced L-shaped channel members 14 interconnected to the bottom wall by suitable mounting bolts 15 having encircling spacers 16 to locate the assembly 13 in spaced relation to the base. The rectifiers 12 are connected to the base of U-shaped cooling fins 17 which span the distance between the two L-shaped mounting channel members 14 and are secured thereto in any suitable manner. Applicant has found that exceptionally satisfactory results are obtained by employing a relatively thick U-shaped aluminum extrusion for the heat skin members. Thus for example, a seven by seven inch aluminum extrusion of three-eighths inch thickness is found to operate satisfactorily at 600 amperes continuous output while maintaining the controlled rectifiers 12 well within their rated current capabilities. A similar shaped one-eighth inch 21 sink is found to be ineffective under comparable operating conditions.

The mounting of the rectifier assembly 13 immediately adjacent the front panel also permits very convenient servicing of the assembly 13. Thus, the entire front panel 4 of the housing is removably attached to the sidewall and top of the housing 1 by a plurality of interconnecting bolts 18. This permits very convenient servicing of such assembly in the event a controlled rectifier fails. Furthermore, the desired cooling of the rectifiers is maintained by providing panel openings 19 in the front panel in alignment with the assembly 13 such that maximum air flow over the rectifier assembly 13 is established and maintained.

The control circuitry for controlling the firing of the controlled rectifiers 12 and the setting of the characteristic of the machine is divided into a plurality of individual circuit modules as disclosed in applicant's previously identified applications. In accordance with a particularly important feature of the present invention, the modules are physically separated and mounted as a circuit board assembly 20 which is mounted to the top central wall of the housing immediately above the main transformer assembly 5. The assembly 20 is connected to a separate removable control box 21 which is mounted and forms a part of the front panel 4.

In accordance with the present invention, the card assembly 20 includes a master circuit board in the form of a printed card 22 having a terminal bank 23 along the lower edge thereof. The master printed card 22 is mounted by suitable depending brackets 24 to the upper wall of the housing 1, with the board disposed in a vertical plane. Laterally spaced across the master card 22 is a plurality of similar printed circuit card receptacles 25 of the plug-in variety which open outwardly toward the front panel 4. Each of the receptacles 25 accepts a different one of the printed cards forming each module of the control assembly. A retaining clip 25a is secured to the bottom wall of a card enclosure to securely support the cards. Thus, in the illustrated embodiment of the invention, seven different receptacles are illustrated to respectively receive related circuit boards. In the illustrated embodiment of the invention, three firing circuit boards 26, 27, and 28 are provided, each of which is related to one phase of the three phase power supply and is interconnected to the corresponding pair of controlled rectifiers 12 for the related power phase. The three boards are shown connected to the three receptacles mounted on the left side of the master circuit board. An inductor circuit board 29 is provided in the center of the assembly and it is interconnected to the terminal bank to introduce the inductance control for the saturable reactor inductor 9 will control the current to the control windings provided on the inductance or saturable reactor control. The card 30 shown immediately to the right of the inductor board provides a voltage feedback signal. Similarly, the next card 31 may provide a current feedback signal; with the final card 32, shown to the rightmost edge of the assembly, providing the desired slope control. The entire assembly is provided with a protective cover 33 secured to the master circuit board 22 by one or more removable locking bolt assemblies 34. The circuit board assembly 20 is secured within the housing immediately behind the removable control box 21 which as previously noted, constitutes and forms a part of the front panel 4.

Generally, the movable box 21 includes a front panel 35 to which a boxlike extension is connnected. The front panel 35 is somewhat larger than the forward edge of the box 21 and overlies an opening 36 in the front panel 4, with the box projecting inwardly into the housing 1 to define a second enclosure within the housing. The panel 35 is releasably attached to the front panel 4 by four quick release connectors 36a at the four corners of the panel 35, to permit convenient and rapid removal and replacement to the housing 1.

In the illustrated embodiment of the invention, a dual control system is provided in the circuit similar to that disclosed in applicant's copending application. Each of the controls includes separate control knobs 37, 38 and 39 on the panel 35 of the movable box 21 for controlling the inductance, the slope and the voltage, respectively. In addition, a common DC ampmeter 40 and a common DC volt meter 41 is provided for providing a continuous indication of the output voltage and current at any given instance. A remote voltage receptacle 42 may be provided as well as auxiliary control receptacles such as an auxiliary voltage outlet, a contactor outlet, and the like.

Figure 4:
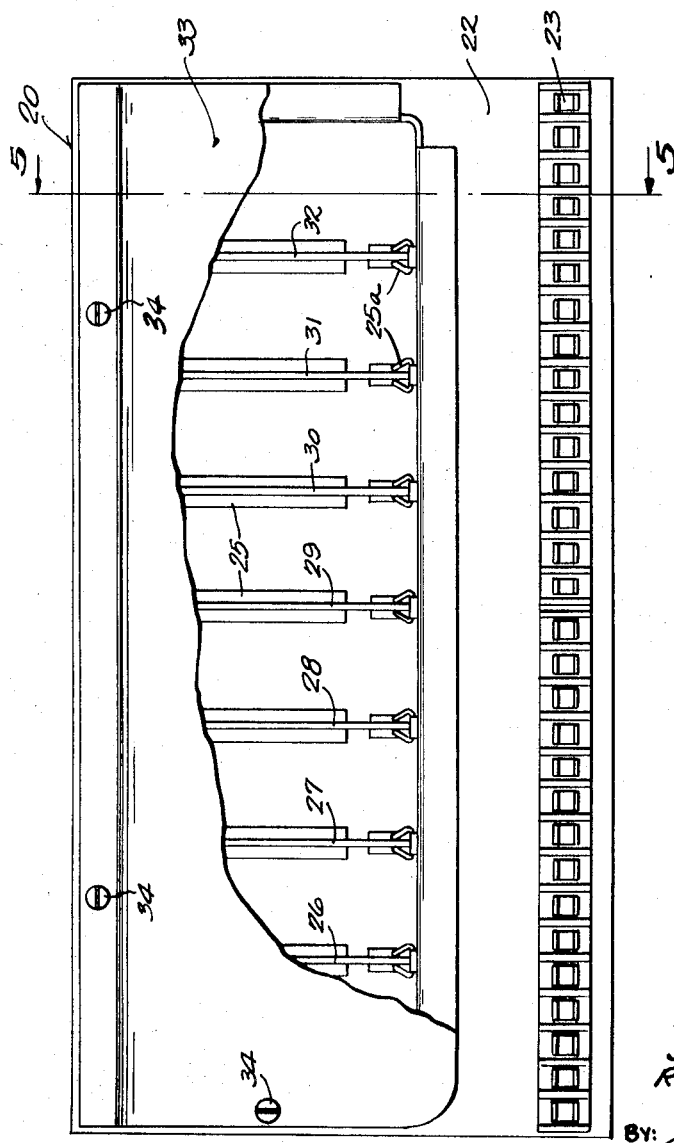
FIG. 4 is an enlarged elevational view taken generally along lines 3–3 of FIG. 2, more clearly illustrating the preferred circuit mounting arrangement in accordance with the present invention.
Figure 6:
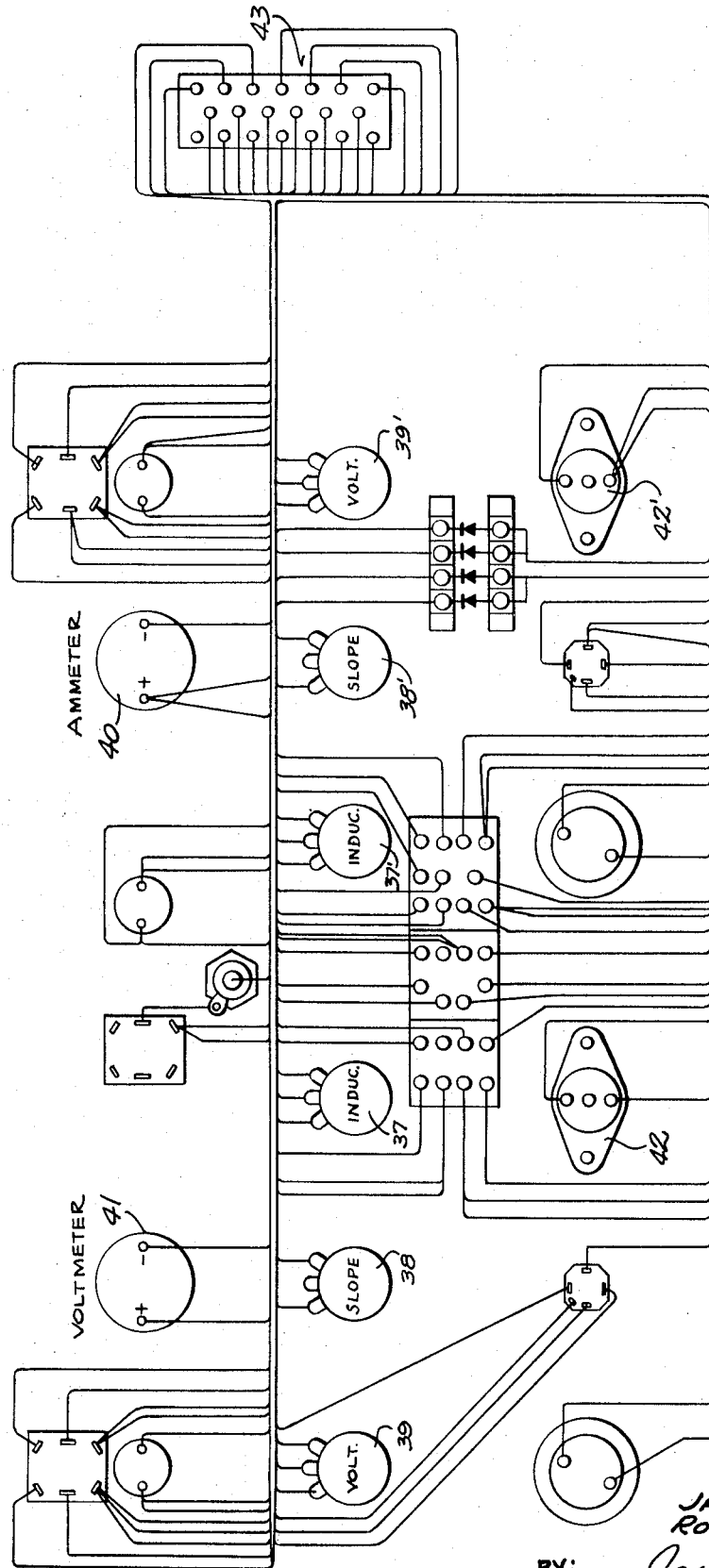
FIG. 6 is a diagrammatic wiring diagram of the remote control box generally showing the components carried thereby and releasably interconnected to the circuit board assembly of FIG. 4.

The several elements may be interconnected into a wiring circuit for example, as schematically shown in FIG. 4, with the elements interconnected to the several terminals of a multiple terminal releasable connector 43 mounted to the back wall of the box 21. A corresponding related receptacle 44 releasably mates with connector 43 and is connected by a cable 45 to the terminal bank 23 on the master circuit board 22 and provides proper connection of the several elements into the circuit for example a shown in applicant's previously referred to copending application.

RESUME

The present invention thus provides a very convenient compact assembly including a remote control unit including the complete control and readout assembly necessary for controlling of welding conditions. The releasable interconnection of the control box in alignment with the control assembly consisting of the several printed circuit cards provides very convenient, inexpensive and rapid servicing. In addition, the circuit card construction with the master printed circuit board minimizes the individual wiring, soldering, and the like and thus, is particularly adapted to mass production processes.

We claim:

1. An arc welding power supply having, in combination, a transformer-rectifier assembly employing triggered control rectifier means and a control circuit for sensing the voltage and current characteristics of the arc and controlling the firing of the control rectifier means in accordance therewith, an outer housing, means supporting said transformer-rectifier assembly within said housing, a separate control assembly mounted within said housing and including said control circuit, a separate control housing releasably secured to an outer panel of the outer housing and having control elements mounted within said separate control housing, and circuit connecting means the control elements in the control housing to the control circuit of the control assembly to permit adjustment of the current and voltages supplied to the arc.

2. The arc welding power supply of claim 1 wherein said outer housing includes a removable front panel, said transformer-rectifier assembly is mounted with said outer housing immediately adjacent said removable front panel, and said separate control housing is releasably secured to said front panel.

3. The arc welding power supply of claim 1 wherein said control hosing includes a front panel member releasably attached to the outer housing across an opening in the outer panel of said outer housing and having a boxlike enclosure projecting into said outer housing, and said circuit connecting means including a cable releasably connected to the boxlike enclosure and connected to the control circuit.

4. The arc welding power supply of claim 1 wherein said control housing includes a pair of duplicate control input means.

5. The arc welding power supply of claim 1 wherein the rectifier means includes a plurality of controlled rectifiers, and said control assembly including individual firing circuit boards for each phase for the firing of the related rectifiers and a plurality of individual control circuit boards for controlling different characteristics of the output, a master circuit board mounted within said outer housing and having a plurality of plug-in receptacles to support the individual circuit boards and to connect them into said control circuit.

6. The arc welding power supply of claim 1 wherein said control housing is mounted across an opening in the outer panel of said outer housing and said control assembly includes a master printed circuit board mounted within the outer housing behind said control housing and having a plurality of plug-in receptacles opening toward said control housing, separate control cards for controlling a plurality of arc characteristics, separated firing control cards for said rectifier means, said control cards being releasably inserted in selected receptacles of said circuit board to establish connection into said control circuit and projecting forwardly toward said control housing, and said circuit connecting means including cable means releasably interconnecting said master circuit board and the control elements in the control housing to permit local and remote adjustment of the control circuit.

7. The arc welding power supply of claim 1 including a saturable reactor inductance control in the output of the rectifier means, and said control housing includes a pair of duplicate control input means each having individual voltage, slope, and inductance control means, and said circuit connecting means including a cable means connecting said control input means to said control assembly.

8. The arc welding power supply of claim 1 wherein the output circuit of the rectifier means includes a saturable reactor inductance control means, said transformer-rectifier assembly includes a three-phase transformer and a plurality of phase related triggered control rectifiers, said control assembly including individual firing circuit boards for each phase for the firing of the related rectifiers and individual circuit boards for controlling the voltage, the slope, and the inductance control means.

9. The arc welding power supply of claim 1 wherein said power supply includes a saturable reactor inductance control means in the output circuit of the transformer-rectifier assembly, said control assembly including a direct current saturation control element for said inductance control means, said control assembly including a master printed circuit board mounted within the outer housing behind said control housing and having a plurality of plug-in receptacles opening toward said control housing separate control cards for controlling the slope, the voltage, and the inductance of the output, separate firing control cards for said rectifier means, said control cards being releasably inserted in selected receptacles of said master circuit board to establish connection into the control circuit and projecting forwardly toward said control housing, and said circuit connecting means including cable means releasably interconnecting said master circuit board and the control elements in the control housing to permit local and remote adjustment of the control circuit.

10. The arc welding power supply of claim 9 wherein said outer housing includes a front panel having said opening in the upper portion slightly larger than said control housing, said control housing including a front mounting wall overlapping the front panel at said opening and projecting inwardly therefrom, means releasably connecting the mounting wall to the overlapping front panel, and a releasable connector means for said able means mounted to the inner portion of the control housing.